(12) United States Patent
Rehling

(10) Patent No.: US 10,919,084 B2
(45) Date of Patent: Feb. 16, 2021

(54) TOOL HOLDER

(71) Applicant: BÖLLHOFF VERBINDUNGSTECHNIK GmbH, Bielefeld (DE)

(72) Inventor: Stefan Rehling, Bückeburg (DE)

(73) Assignee: Böllhoff Verbindungstechnik GmbH, Bielefeld (DE)

(*) Notice: Subject to any disclaimer, the term of this patent is extended or adjusted under 35 U.S.C. 154(b) by 248 days.

(21) Appl. No.: 15/976,080

(22) Filed: May 10, 2018

(65) Prior Publication Data

US 2018/0333769 A1 Nov. 22, 2018

(30) Foreign Application Priority Data

May 16, 2017 (DE) .................. 10 2017 110 603

(51) Int. Cl.
  B21J 15/32 (2006.01)
  B23K 26/38 (2014.01)
  (Continued)

(52) U.S. Cl.
  CPC ............... B21J 15/32 (2013.01); B21J 15/10 (2013.01); B21J 15/30 (2013.01); B23K 26/38 (2013.01);
  (Continued)

(58) Field of Classification Search
  CPC ... B21J 15/32; B21J 15/30; B21J 15/10; B21J 13/04; B23K 26/38; B23K 26/40;
  (Continued)

(56) References Cited

U.S. PATENT DOCUMENTS

| 686,352 A | 11/1901 | Sellers et al. |
| 2,875,808 A | 3/1959 | Nelson |

(Continued)

FOREIGN PATENT DOCUMENTS

| CN | 1115227 C | 7/2003 |
| CN | 102006840 A | 4/2011 |

(Continued)

OTHER PUBLICATIONS

English translate (KR20140026817A), retrieved date Jun. 17, 2020.*

(Continued)

*Primary Examiner* — Adam J Eiseman
*Assistant Examiner* — Mohammed S. Alawadi
(74) *Attorney, Agent, or Firm* — Reising Ethington P.C.; Matthew J. Schmidt

(57) ABSTRACT

A C-shaped tool holder consisting of an integral frame structure that is delimited by an inner and an outer edge, each C-shaped, in which the C-shaped edges are made from and are connected to each other by at least five multiple-vertex frame bodies that are integrated into the frame structure, in particular triangles, quadrilaterals and pentagons, wherein in each case an inner side of the individual multiple-vertex frame bodies is a connecting surface, continuously curving along a circumferential direction, along the sides of the respective multiple-vertex frame body, and the inner and the outer C-shaped edge is each delimited to the outside by a continuously curving lateral surface.

20 Claims, 15 Drawing Sheets

Figure 1:
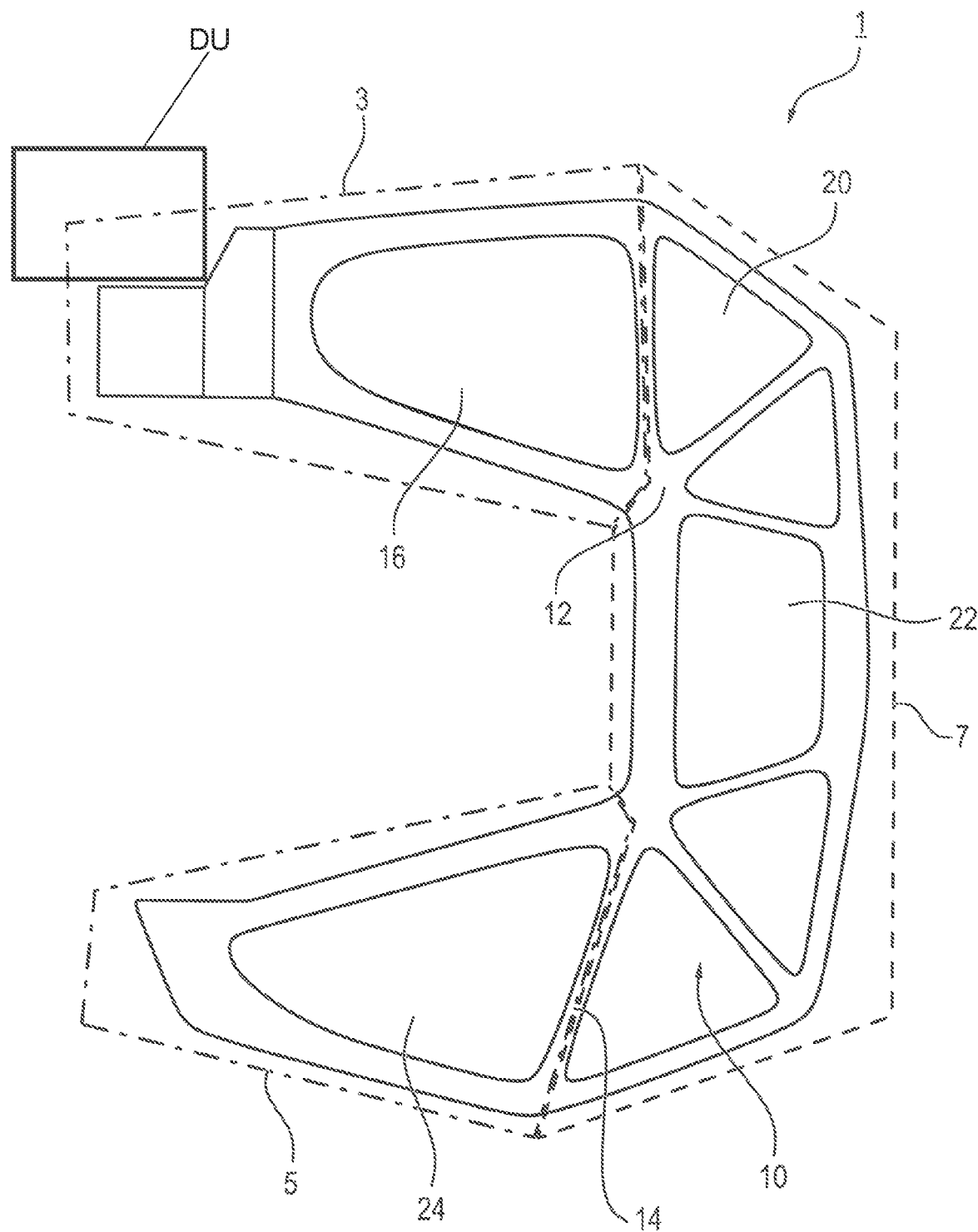

(51) Int. Cl.
  *B21J 15/30* (2006.01)
  *B23K 26/40* (2014.01)
  *B23K 26/402* (2014.01)
  *B21J 15/10* (2006.01)
  *B23K 11/31* (2006.01)
  *B23Q 1/00* (2006.01)
  *B23K 101/24* (2006.01)
  *B23K 101/20* (2006.01)
  *B23K 103/10* (2006.01)
  *B23K 103/04* (2006.01)
  *B23K 103/16* (2006.01)

(52) U.S. Cl.
  CPC ............ *B23K 26/40* (2013.01); *B23K 26/402* (2013.01); *B23K 11/318* (2013.01); *B23K 2101/20* (2018.08); *B23K 2101/24* (2018.08); *B23K 2103/04* (2018.08); *B23K 2103/10* (2018.08); *B23K 2103/16* (2018.08)

(58) Field of Classification Search
  CPC .............. B23K 26/402; B23K 2101/24; B23K 2101/20; B23K 11/318; B23K 2103/04; B23K 2103/16; B23Q 1/0054
  USPC ........................................................ 72/391.4
  See application file for complete search history.

(56) References Cited

U.S. PATENT DOCUMENTS

| | | | | |
|---|---|---|---|---|
| 5,477,597 A | * | 12/1995 | Catania | .................... B21J 15/10 |
| | | | | 29/33 K |
| 6,467,826 B2 | | 10/2002 | Strömberg et al. | |
| 7,163,247 B2 | * | 1/2007 | Stromberg | ............... B23Q 1/01 |
| | | | | 294/86.4 |
| 9,873,148 B2 | * | 1/2018 | Park | ......................... B21J 15/10 |
| 2001/0030433 A1 | * | 10/2001 | Stromberg | ............... B21J 15/10 |
| | | | | 294/86.4 |
| 2007/0034662 A1 | * | 2/2007 | Opper | ...................... B21J 13/03 |
| | | | | 227/51 |
| 2008/0281452 A1 | | 11/2008 | Okamoto et al. | |
| 2015/0101175 A1 | * | 4/2015 | Xi | ............................ B21J 15/28 |
| | | | | 29/525.06 |
| 2016/0325341 A1 | * | 11/2016 | Gostylla | ............. B23K 20/227 |

FOREIGN PATENT DOCUMENTS

| | | | | |
|---|---|---|---|---|
| CN | 103658494 A | | 3/2014 | |
| CN | 103920843 A | | 7/2014 | |
| CN | 106001370 A | | 10/2016 | |
| DE | 69911040 T2 | | 6/2004 | |
| DE | 112005001375 T5 | | 9/2007 | |
| DE | 102013000387 A1 | | 7/2014 | |
| DE | 102015104149 A1 | | 6/2016 | |
| KR | 20080110364 A | * | 12/2008 | ............ B21J 15/025 |
| KR | 20080110364 A | | 12/2008 | |
| KR | 20140026817 A | * | 3/2014 | ............ B21J 15/025 |
| KR | 20140026817 A | | 3/2014 | |

OTHER PUBLICATIONS

Rhinoceros—NURBS, retrieved date Jun. 17, 2020.*
KR20080110364A, retrieved date Nov. 6, 2020.*
Database WPI, Thomson Scientific, London, GB; AN 2009-f18486; XP002785457; (1 page).
Database WPI, Thomson Scientific, London, GB; AN 2014-E53428; XP002785458; (1 page).
EP Search Report for EP Application No. 18171324.9 dated Oct. 9, 2018 (8 pages).
CN Office Action for CN Application No. 201810469415.1 dated Sep. 25, 2019 (9 pages).

* cited by examiner

TOOL HOLDER

1. CROSS REFERENCE TO RELATED APPLICATIONS

This application claims priority to German Patent Application No.: DE 102017110603.0 filed May 16, 2017. The content of this priority application is incorporated herein by reference in its entirety.

2. TECHNICAL FIELD

The present disclosure relates to a C-shaped tool holder consisting of an integral frame structure, in particular a C-frame, as well as a joining device, in particular a rivet setting device, which is made using the abovementioned C-frame.

3. BACKGROUND

In known joining or forming applications, the resulting forces in the pressing, riveting or punching process must be absorbed by an appropriate frame design. Frequently, C-frame designs known for this purpose are used. In particular in the case of automated processes in which such C-frame tools are driven by robots, the weight of the C-frame plays a large role.

A C-frame known from the prior art is described in DE 699 11 040 T2. Such lightweight design C-frames are designs composed of bar elements firmly connected in junction points (trussed frame). These bar elements are designed in a triangle structure. To optimize the material stresses under load in the junction points, the bar elements are rounded by circular arcs in the junction points.

Trussed frames possess good weight characteristics in comparison to conventional compact structures or C-frames composed of solid material. However, their stiffness against bending-up is lower. This leads to a larger bending-up path as well as a larger bending-up angle for a trussed frame with the same load and the same outreach of the legs as for a conventional C-frame.

A too-large bending-up angle, however, is undesired in many joining methods since it subjects the employed drive system to a high lateral force strain. To reduce the bending-up angle in trussed frames, the structure can be caused to deform in such a way that the opposite, outer leg surfaces remain nearly parallel to each other in the deformed state by suitably introducing the process force outside of the truss junction points, as described in the above document of the prior art.

Due to the still high weight load of, for example, the robots in the case of known setting devices and C-frames, the need for weight-reduced and therefore more mobile C-shaped tool holders is great. Moreover, the demand for stiffness and load-bearing capacity of the C-frame increases as its size stays the same or decreases. It is therefore the object of the present invention to provide a C-shaped tool holder that is more capable compared to the prior art.

4. SUMMARY

In at least some embodiments, the C-shaped tool holder consists of an integral frame structure that is delimited by an inner and an outer edge, each of which is C-shaped. The C-shaped edges are made from and connected to each other by at least five multiple-vertex frame bodies integrated into the frame structure, in particular triangles, quadrilaterals and pentagons, wherein in each case an inner side of the individual multiple-vertex frame bodies is a connecting surface continuously curving along a circumferential direction along the sides of the respective multiple-vertex frame body, and the inner and the outer C-shaped edge is each delimited to the outside by a continuously curving lateral surface.

The C-shaped tool holder, which in general is also referred to as a C-frame in conjunction with, for example, rivet setting devices or similar joining tools, is formed by an integral trussed frame, meaning one that is not composed of individual parts. This trussed frame, which consists of a plurality of frameworks, may be carved out from a block of base material, for example milled from a metal block, such as steel or aluminum, or a hybrid fiber-reinforced plastic (FRP) or a fiber-plastic composite (FPC) or a metal-fiber composite plastic hybrid.

The truss structure arises from the arrangement of a plurality of multiple-vertex frame bodies in the interior of the C-shaped tool holder which is enclosed by the inner and the outer C-shaped edge of the C-shaped tool holder. The inner and outer edge are spanned and connected to each other by the integrated multiple-vertex frame bodies that are combined with each other. The inner and the outer C-shaped edge is distinguished that the lateral surfaces that face outwards, i.e., the lateral surfaces that face outwards from the enclosed interior of the C-shaped tool holder, run continuously curving. Preferably, the continuously curving progression does not extend to the free ends of the C-shaped tool holder. This continuously curving progression also applies for the circumferential inner surfaces of the multiple-vertex frame bodies that respectively enclose the empty spaces in the multiple-vertex frame bodies. Due to this realized continuously curving progression of the surfaces of the C-shaped tool holder, mechanical stress loads of the individual bar elements within the C-shaped tool holder are optimally distributed in the vicinity of the junction points or intersections by an area of the bifurcation, meaning of a transition area to other bar elements. Moreover, this continuously curving progression of the surfaces achieves a reduction of mechanical stress peaks in these transition areas that otherwise are only decreased with the assistance of roundings between bar elements that border each other.

According to an embodiment, the C-shape of the tool holder consists of a first and a second leg arranged opposite each other and a connecting leg, wherein the connecting leg connects the first and the second leg to each other to form a C-shape. According to another embodiment, the connecting leg consists of at least two frame triangles and one multiple-vertex frame body. The first and the second leg, which are arranged opposite each other, each consist of at least one multiple-vertex frame body.

Depending on the use case of the C-shaped tool holder, the first and the second legs as well as the connecting leg that connects them can be differently dimensioned. Furthermore, with the assistance of the number of the integrated multiple-vertex frame bodies used to make the individual legs it is taken into account which loads the tool holder must withstand. Moreover, a flexibility or respectively stiffness of the tool holder adapted to the use case is realized by designing the legs out of the multiple-vertex frame bodies.

As an advantageous and preferred base design, the connecting leg may be made from a central multiple-vertex frame body, in particular a frame quadrilateral, and two frame triangles that border it and are opposite each other. This design of the connecting leg ensures a sufficient opening space of the C-shaped tool holder. Moreover, a corresponding connection space is provided in order to provide the first and second leg starting from the connecting leg. Depending on the required length of the first and second leg, these consist at least of one multiple-vertex frame body, in particular a frame pentagon or a frame quadrilateral. In the same way, it may also be preferred to provide the first and the second leg from a frame quadrilateral in conjunction with a frame triangle or from a frame pentagon in conjunction with a frame triangle.

According to another embodiment of the tool holder, the connecting leg is composed of at least four frame triangles and one frame quadrilateral, while the first and the second leg are each made from at least one frame quadrilateral or one frame pentagon.

According to another embodiment of the tool holder, the multiple-vertex frame bodies each enclose a surface that is surrounded by a bar structure with a depth and a width. The depth of the bar structure is defined orthogonally to the surface and the width is defined parallel to the surface. Moreover, the depth surfaces of the multiple-vertex frame bodies that are arranged opposite each other, are spaced apart from each other by the width of the bar structure and run parallel to the depth are continuously curving frame surfaces.

The multiple-vertex frame bodies may consist of a plurality of bars that are defined by the depth and the width. The number of the bars that are connected to each other decides whether it is a frame triangle, a frame quadrilateral or a frame pentagon. Accordingly, a multiple-vertex frame body consisting of, for example, four bar elements has two equally large surfaces spaced apart from each other by the depth. These two surfaces are delimited to the outside and in the direction of the free inner space, meaning to the inside, by continuously curving frame surfaces. Especially the continuously curving progression of these frame surfaces causes the mechanical stress reduction and stress introduction into the frame structure discussed above in order to avoid disadvantageous mechanical stress peaks, for example in junction points of bar elements.

Further, the depth surfaces of the tool holder may form an inner and an outer contour line per multiple-vertex frame body considered in the depth direction. This inner and outer contour line is each defined as a periodic 4th order NURBS curve on the basis of a plurality of generated junction points at least in corner areas of the respective multiple-vertex frame body.

For designing the C-shaped integral tool holder, NURBS curves may be used. The abbreviation NURBS curves refers to the known non-uniform rational B-splines curves. The curves or surfaces defined on this mathematical basis are part of known CAD systems for modeling any shapes. This mathematical approach makes it possible to undertake shape optimizations taking into consideration, for example, material-specific constraints or constraints defined by mechanical loads so that in addition to a weight reduction, a stability optimization of the tool holder in view of the respective use case is also possible. This may be achieved by the continuously curving progression of the used frame surfaces as well as by the deliberate displacement of junction points to offset polygons (see below).

According to another embodiment, the tool holder has in each case a free end on the first and on the second leg, wherein a drive unit (labeled DU in FIG. 1) or an attachment unit is integrally or modularly provided at at least one end. With the assistance of the free ends provided by the first and the second leg, the tool holder may be usable, for example, for a rivet setting device or 25 another joining tool. While the drive unit is attached to the one free end, a die or a corresponding counter bearing is arranged, for example, on the opposite free end.

According to another embodiment, the tool holder described above consists of an integral structure that is made from the following materials: a metal, in particular steel or aluminum, or a hybrid fiber-reinforced plastic (FRP) or a fiber-plastic composite (FPC) or metal-fiber composite plastic hybrid.

A fiber-plastic composite (FPC) (also: fiber-reinforced plastic or fiber composite plastic, FCP) is a material consisting of reinforcing fibers and a plastic matrix. The matrix surrounds the fibers, which are bound to the matrix by adhesive interaction. By using fiber materials, fiber-plastic composites have a directionally dependent elasticity behavior.

Moreover, the present disclosure comprises a joining device, in particular a rivet setting device, that has a C-shaped tool holder according to one of the embodiments described above in conjunction with a drive unit and a counter bearing, in particular a die.

Furthermore, a design method of a C-shaped tool holder with an integral frame structure is disclosed. This integral frame structure is delimited by the inner and the outer edge, each C-shaped. The design method has the following steps: defining a first and a second leg that are arranged opposite each other and are connected to each other by a connecting leg in order to form a C-shaped structure; forming the first and the second leg as well as the connecting leg from at least five, preferably seven, multiple-vertex frame bodies that are connected to each other; and forming a C-shaped outer edge and a C-shaped inner edge of the tool holder consisting of the multiple-vertex frame bodies that are connected to each other by a continuously curving C-shaped outer lateral surface and a continuously curving C-shaped inner lateral surface as well as forming the individual multiple-vertex frame bodies each with a continuously curving inner frame surface.

The above design method is based on the approach of constructing a contiguous C-shaped tool holder that is not composed of individual frame elements. The result of this design method, which exists in the form of electronic data, can then be passed on to a CNC machine in order to carve out this integral C-shaped tool holder from a solid base body, which may be steel, for example by milling and similar machining methods or also by cutting methods such as laser welding.

To provide the basic structure of the C-shaped tool holder, its structure consisting of two legs that are opposite each other and that are connected to each other by a connecting leg is spanned by at least five multiple-vertex frame bodies. A multiple-vertex frame body refers to a bar design with at least three sides defined by these bar elements that are connected to each other integrally at three corner points. Correspondingly, quadrilaterals, pentagons, hexagons are constructible in the same way in order to make the first and second leg and the connecting leg from these multiple-vertex frame bodies. Furthermore, this C-shaped tool holder is distinguished in that the entirety of the used multiple-vertex frame bodies are connected to each other integrally so that in the context of the production of the C-shaped tool holder they neither have to exist as modular individual parts nor be connected to each other by appropriate connecting means or connecting methods in order to form the tool holder.

In another embodiment, the design method comprises the further steps: defining each multiple-vertex frame body in a common design plane as a frame polygon and defining an offset contour within the design plane that is spaced apart from the frame polygon on both sides so that the offset contour determines a width of the multiple-vertex frame body within the design plane and is composed of two frame polygons.

The C-shaped tool holder may be drafted in a common design plane. Within this design plane, the multiple-vertex frame bodies to be provided with each other in the integral frame structure form frame polygons that are each connected to each other. A frame polygon is a body with multiple vertices with at least three corners. Depending on the position of the frame polygon in the tool holder, this frame polygon can have any number of corners. The majority of the frame polygons that are connected to each other within the design plane form the base shape of the later tool holder in the form of a line design. The individual lines of the frame polygons are continued by bar elements running parallel to them. These bar elements with their dimension with regard to width and depth may take into account the mechanical constraints of the tool holder to be employed in practice. That means that the bar elements are formed taking into account later mechanical loads and material configurations of the tool holder.

This bar structure, which may be initially likewise reduced to a representation in the design plane, is represented with the assistance of the aforementioned offset contour. Since only a one-sided top view of the chosen bar elements is possible in the design plane, the width of the individual bar elements or respectively of the multiple-vertex frame body arises within the design plane from two frame polygons that surround the fundamental multiple-vertex frame body within the tool holder to be designed. Accordingly, the intermediate space between two frame polygons arranged opposite each other and the multiple-vertex frame body situated between them may span the offset contour or the design of the multiple-vertex frame body composed of bar elements.

Furthermore, the width of the offset contour along the individual sides of the frame polygon may be the same or different. The individual bar elements of the frame polygons or respectively of the multiple-vertex frame bodies are dimensioned corresponding to the expected and/or calculated mechanical loads of the tool holder in the later practical use. This opens up the possibility that an individual multiple-vertex frame body does not need to be made from equally thick bar elements. Rather, load and deformation states of the tool holder are taken into account and correspondingly adjusted through different thicknesses of the bar elements. As a result, the offset contour of the individual multiple-vertex frame bodies initially has a constant width. In comparison to each other, the width of different sides of the multiple-vertex frame body can be formed differently or the same.

Further, the design method may have the additional following steps: generating junction points at the corners and in the middle of the sides of the offset polygons and generating periodic $4^{th}$ order NURBS curves consisting of $3^{rd}$ degree polynomials on the basis of the generated junction points. Based on known mathematical principles, junction points are defined at the corners and in the middle of the sides of the individual linear sides of the offset polygons. These junction points form reference points for periodic $4^{th}$ order NURBS curves. The acronym NURBS means in this context non-uniform rational B-splines curves. The mathematical components and use possibilities are usual design elements of, for example, CAD systems or similar software-based design programs. Correspondingly, such a software-based NURBS module is applied to practically realize the integral C-shaped tool holder. These NURBS curves through the junction points optimize the specified offset contour such that the integral frame structure is adapted to the mechanical constraints.

Moreover, the above design method may comprise the computer-based implementation of the design method, such as with a CAD program, and the creation of a computer-based data set for the production of the tool holder. This data set is transferable in the known manner to processing devices or respectively their control units in order to be able to produce the tool holder integrally from one block of material.

The production method of a C-shaped tool holder with an integral frame structure has the following steps: receiving a computer-based data set from a CAD system for the C-shaped tool holder to be produced, which may be as the result of the design method described above; forwarding the computer-aided data set to a production machine, such as a CNC machine or similar; and producing and finishing the C-shaped tool holder according to the computer-based data set.

Once the integral tool holder exists, its ends are also equipped with a drive unit, such as a hydraulic or an electromotive driven punch, and an appropriate counter bearing, such as a die or the like.

5. BRIEF DESCRIPTION OF THE ACCOMPANYING DRAWINGS

Figure 2:
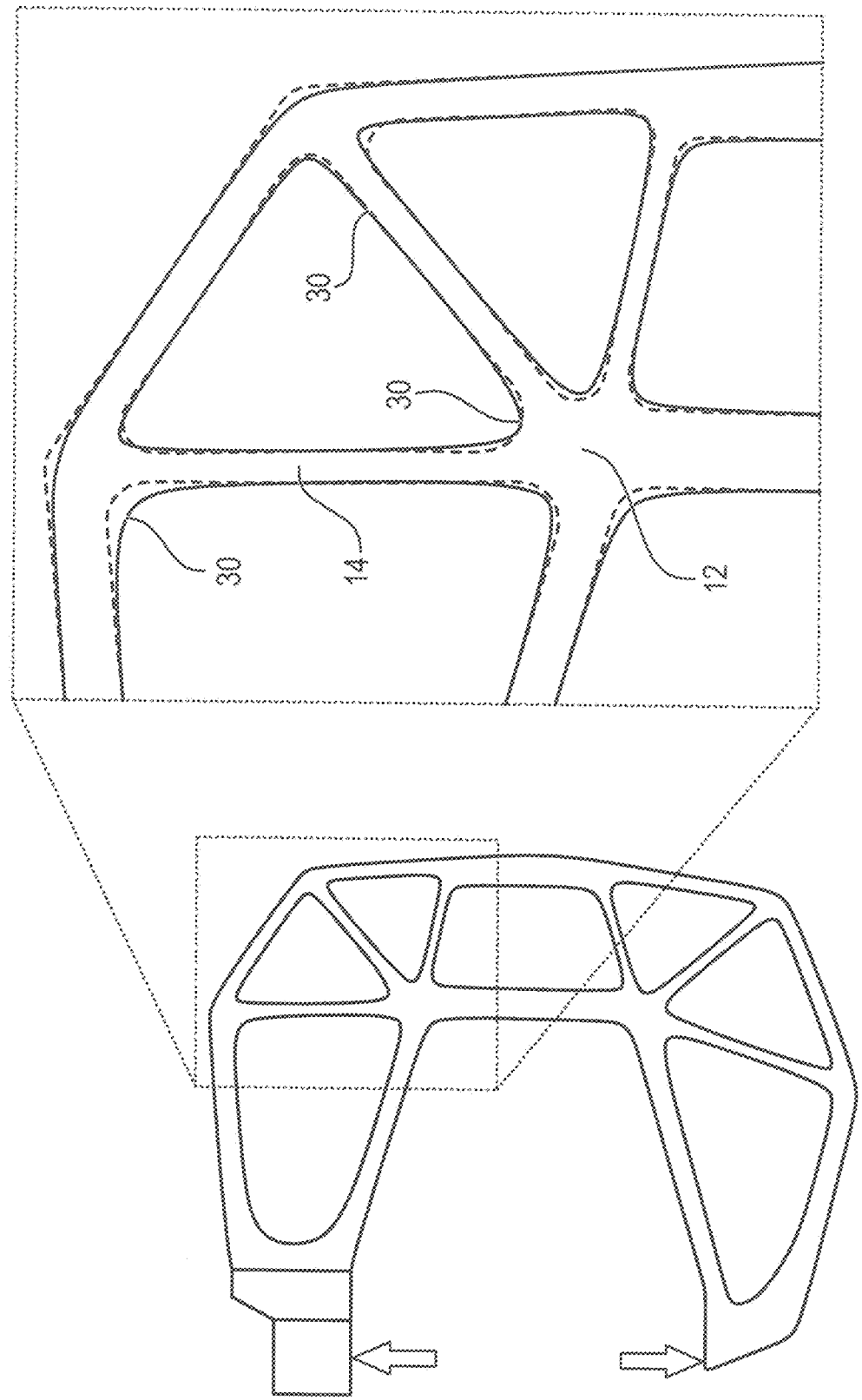
Figure 3:
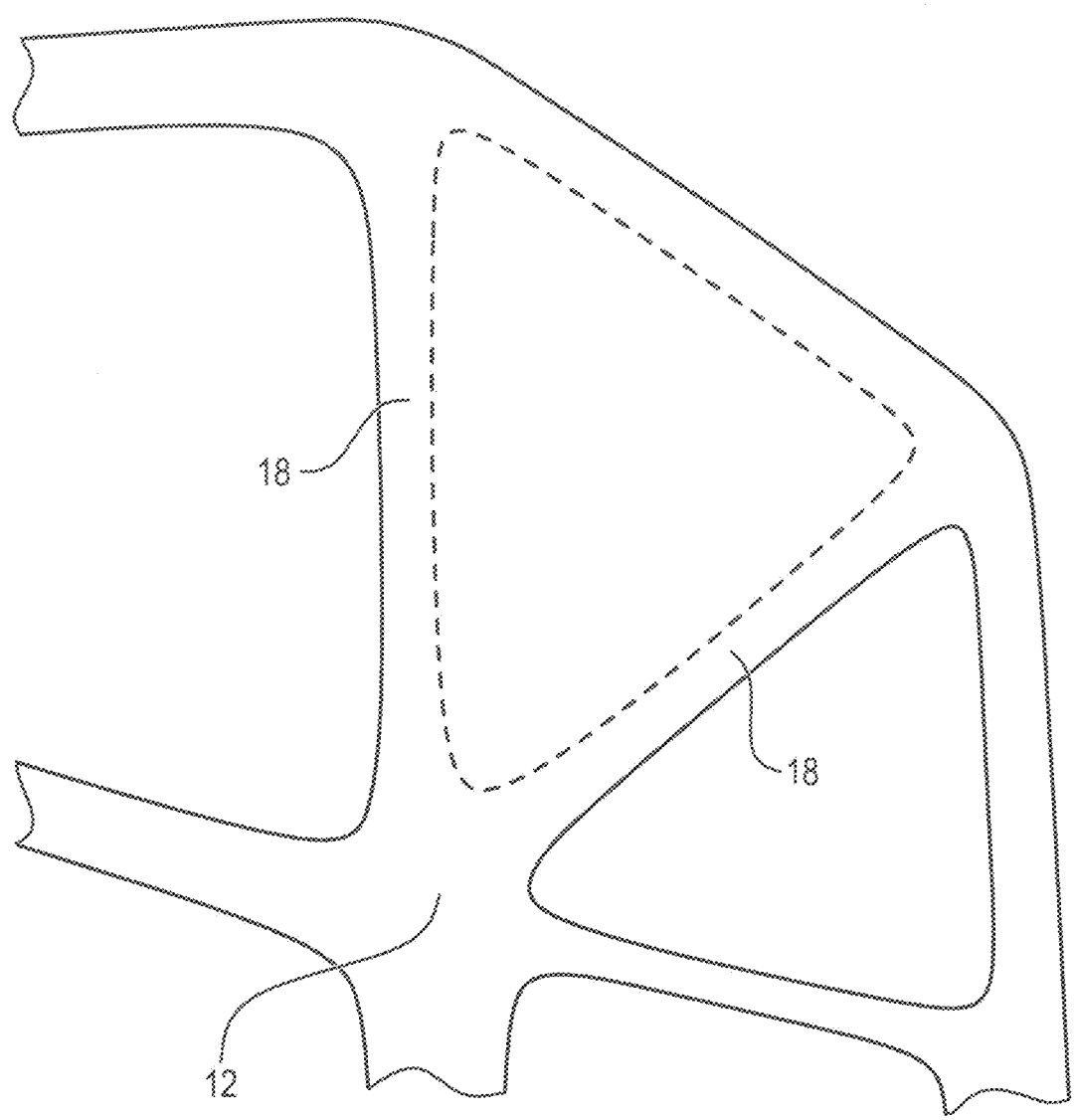
Figure 4:
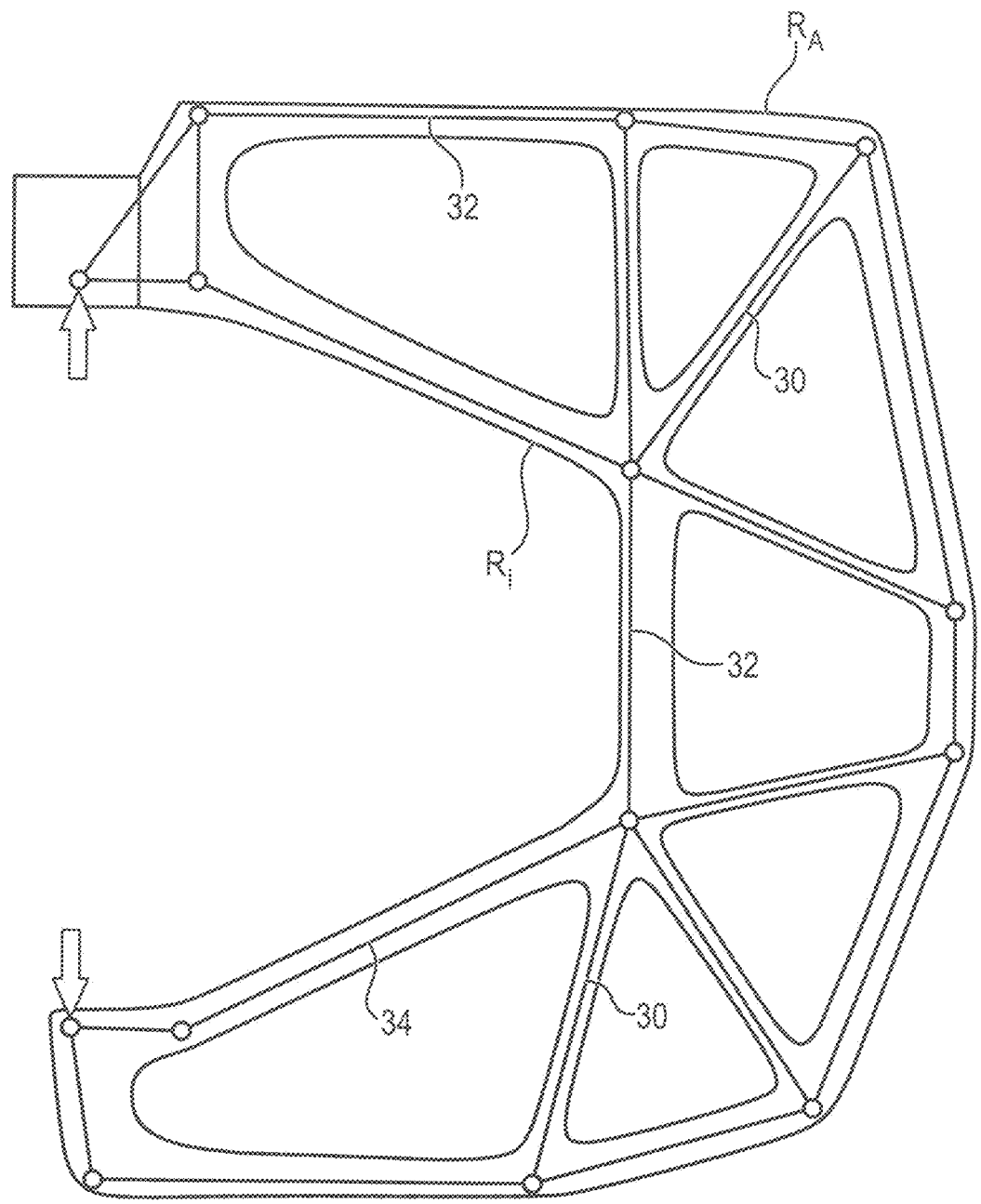
Figure 5:
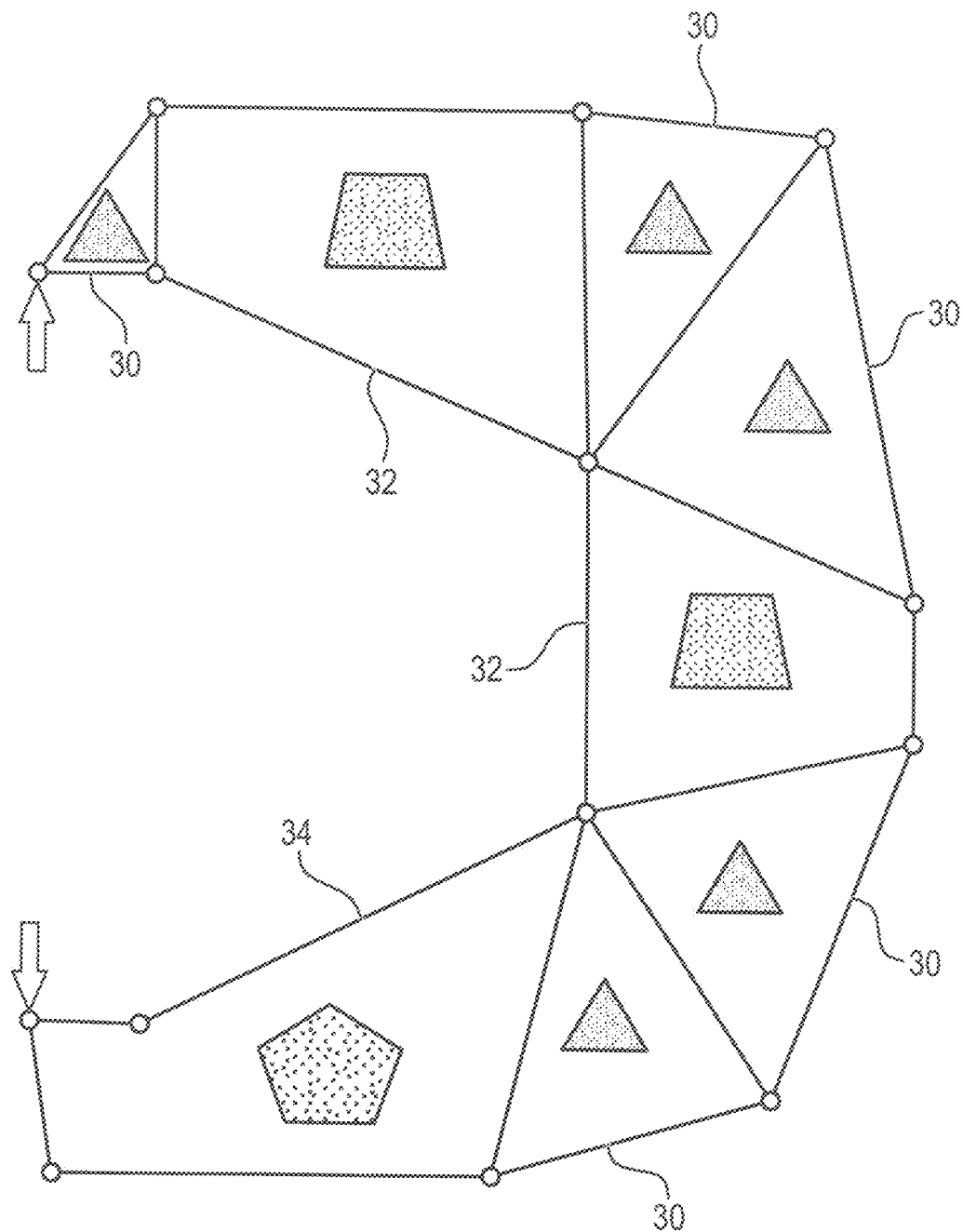
Figure 6A:
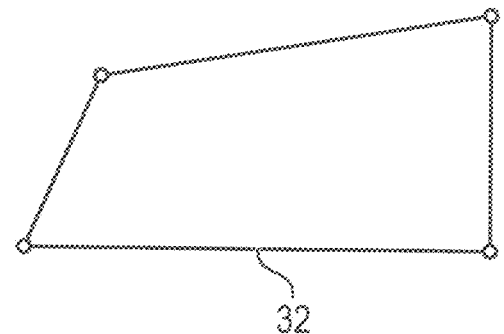
Figure 6B:
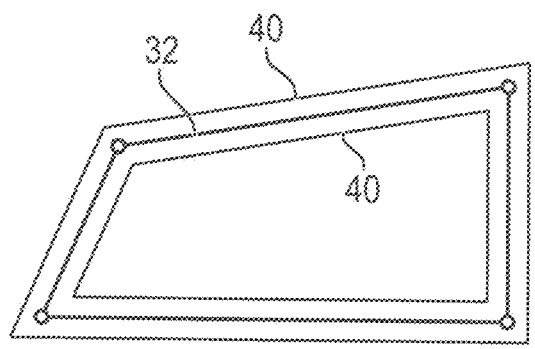
Figure 6C:
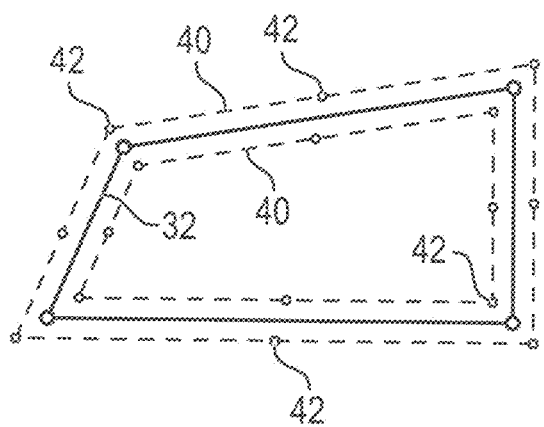
Figure 6D:
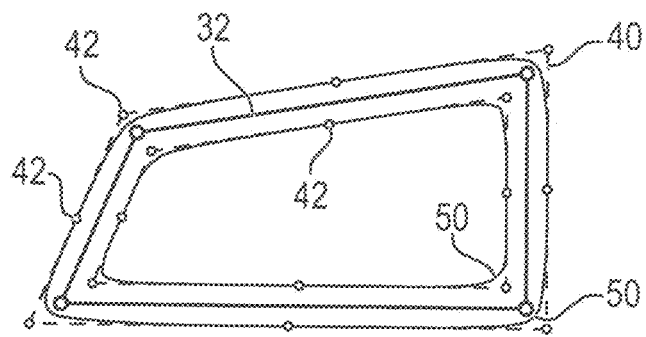
Figure 7:
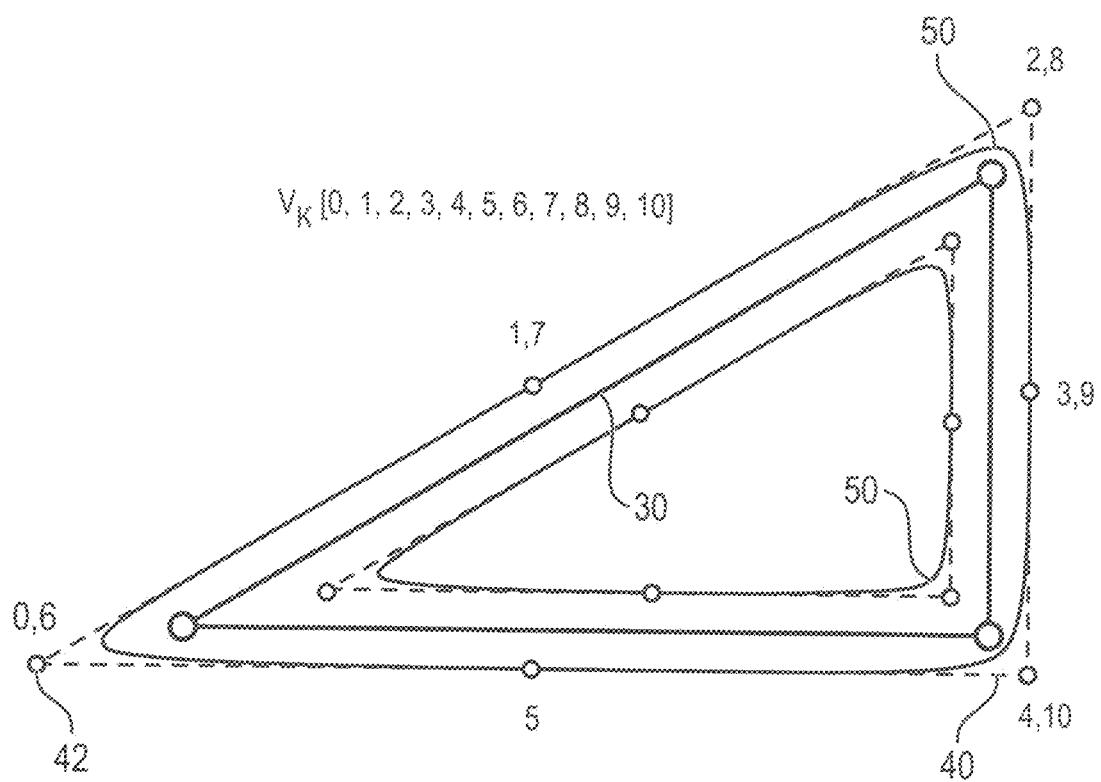
Figure 8:
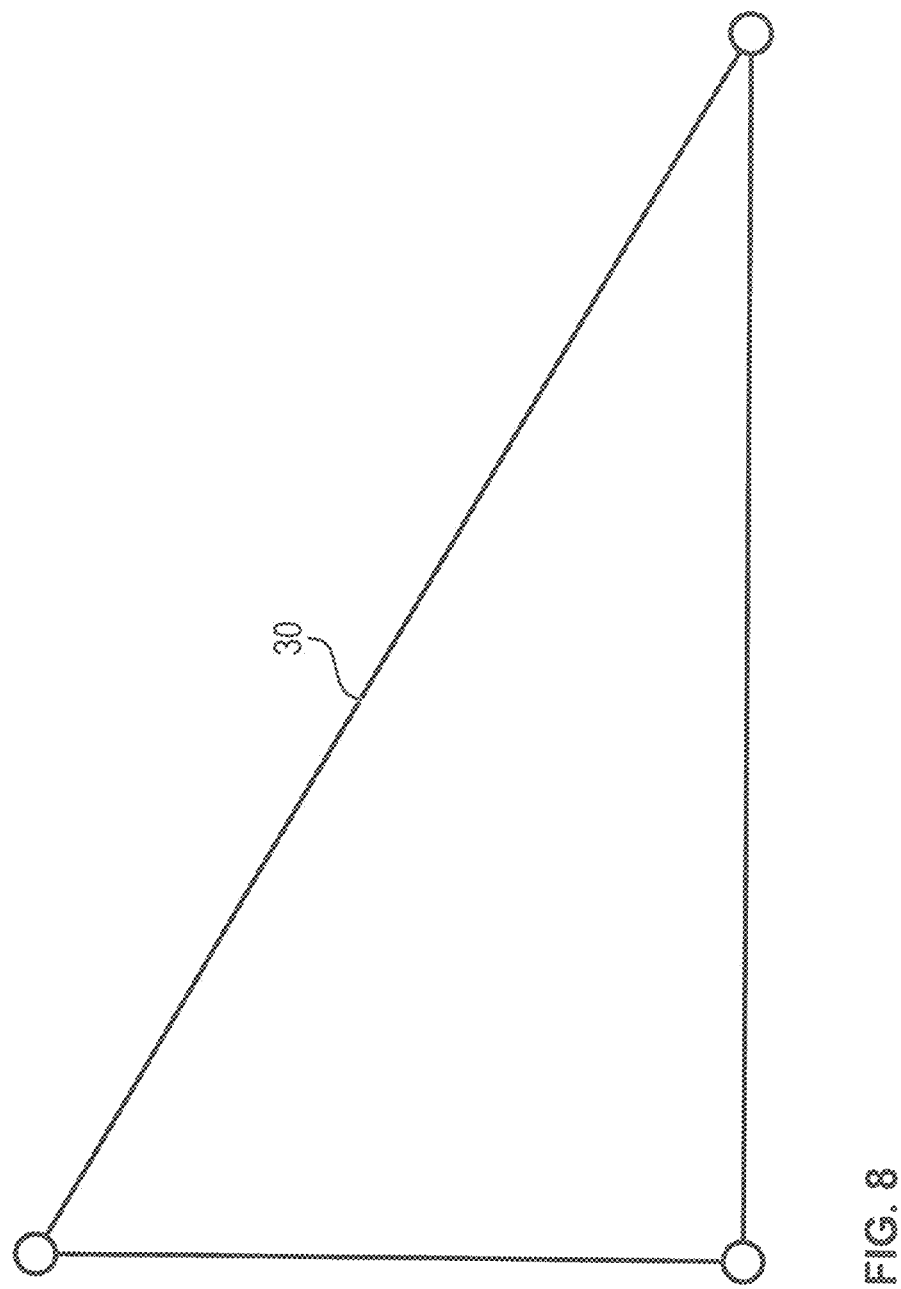
Figure 9:
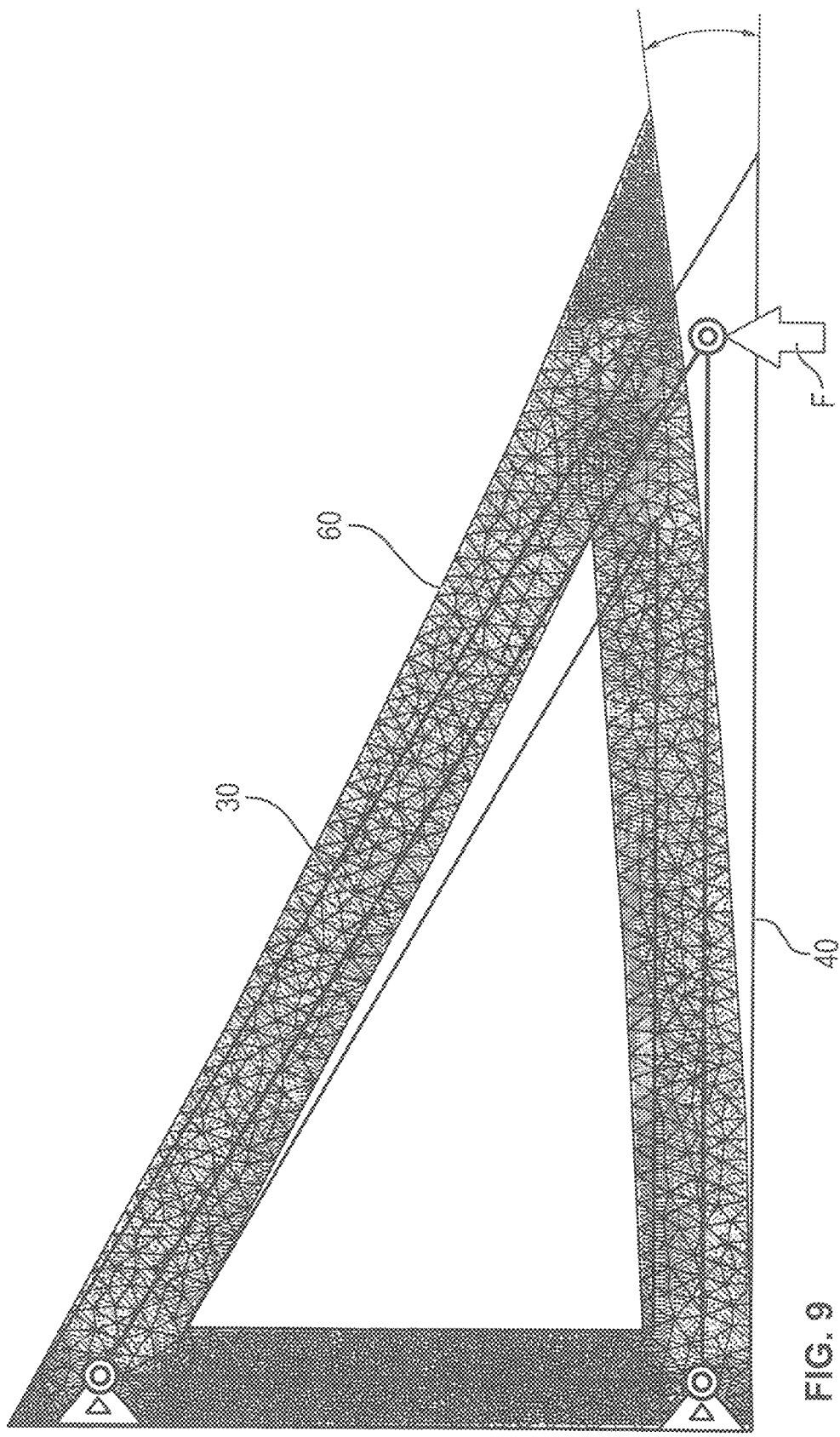
Figure 10:
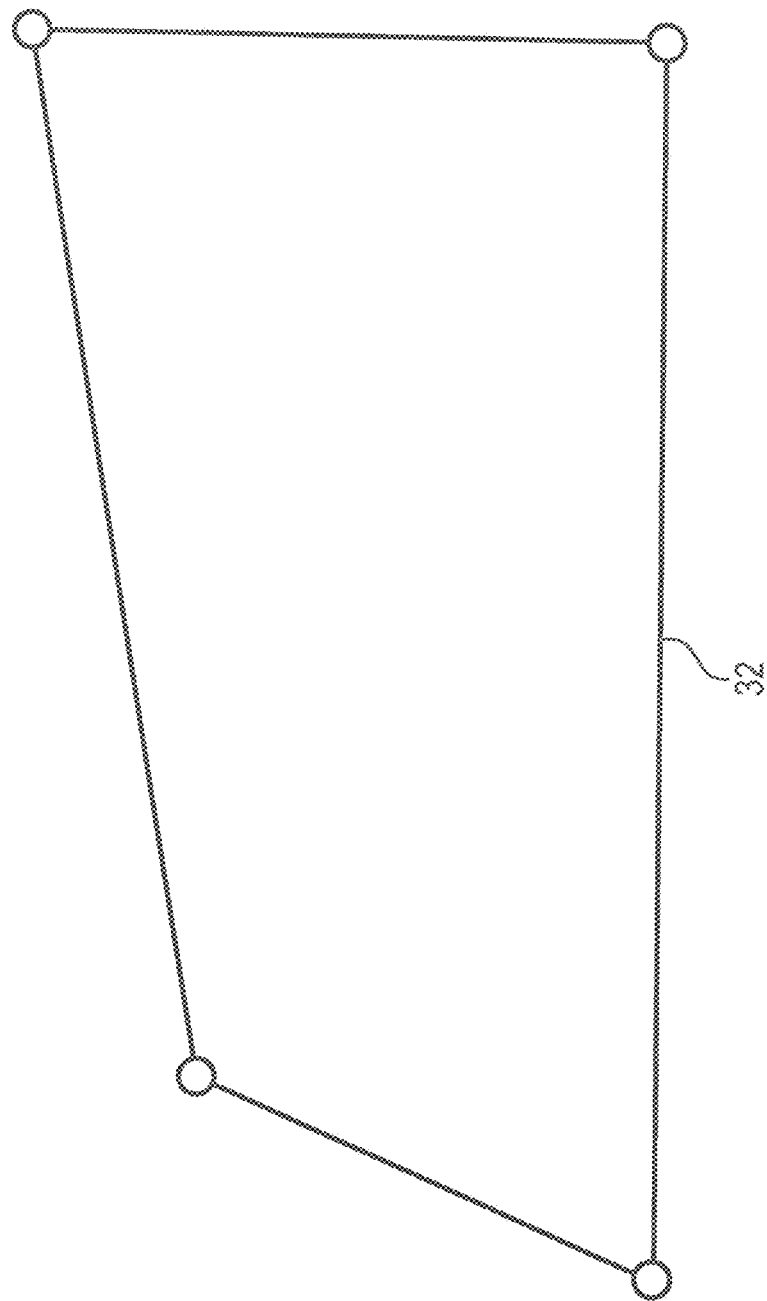
Figure 11:
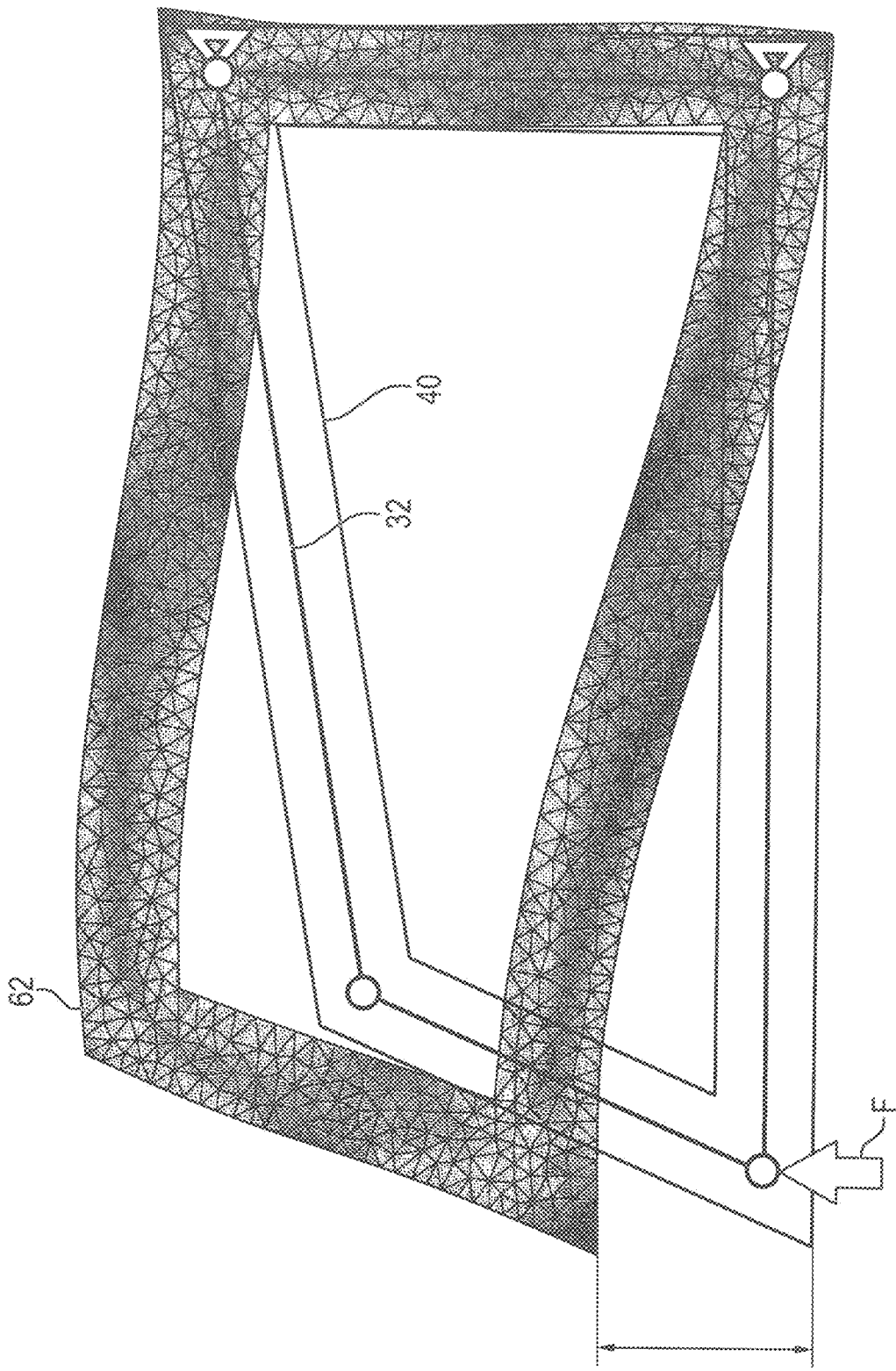
Figure 12:
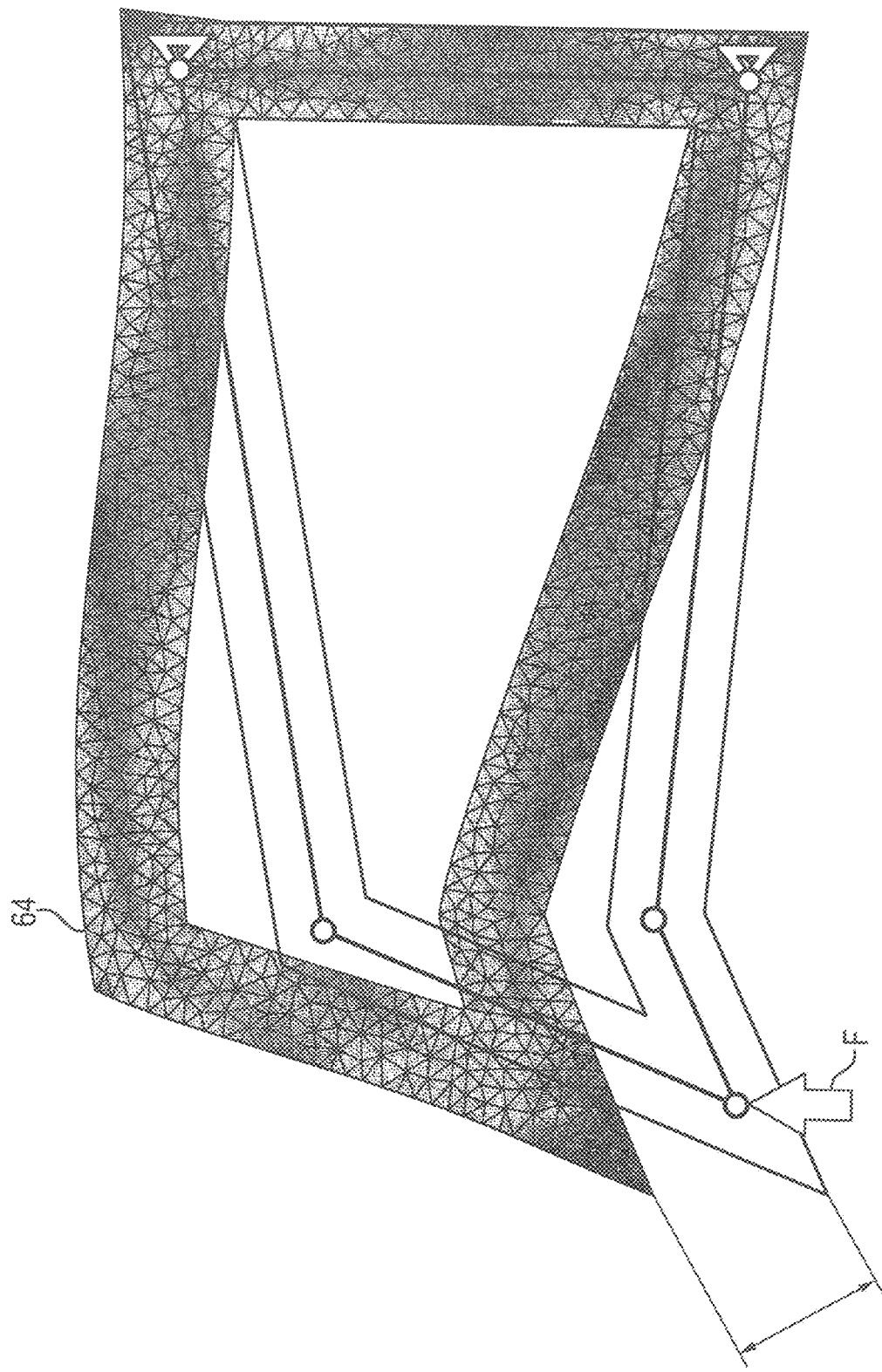
Figure 13:
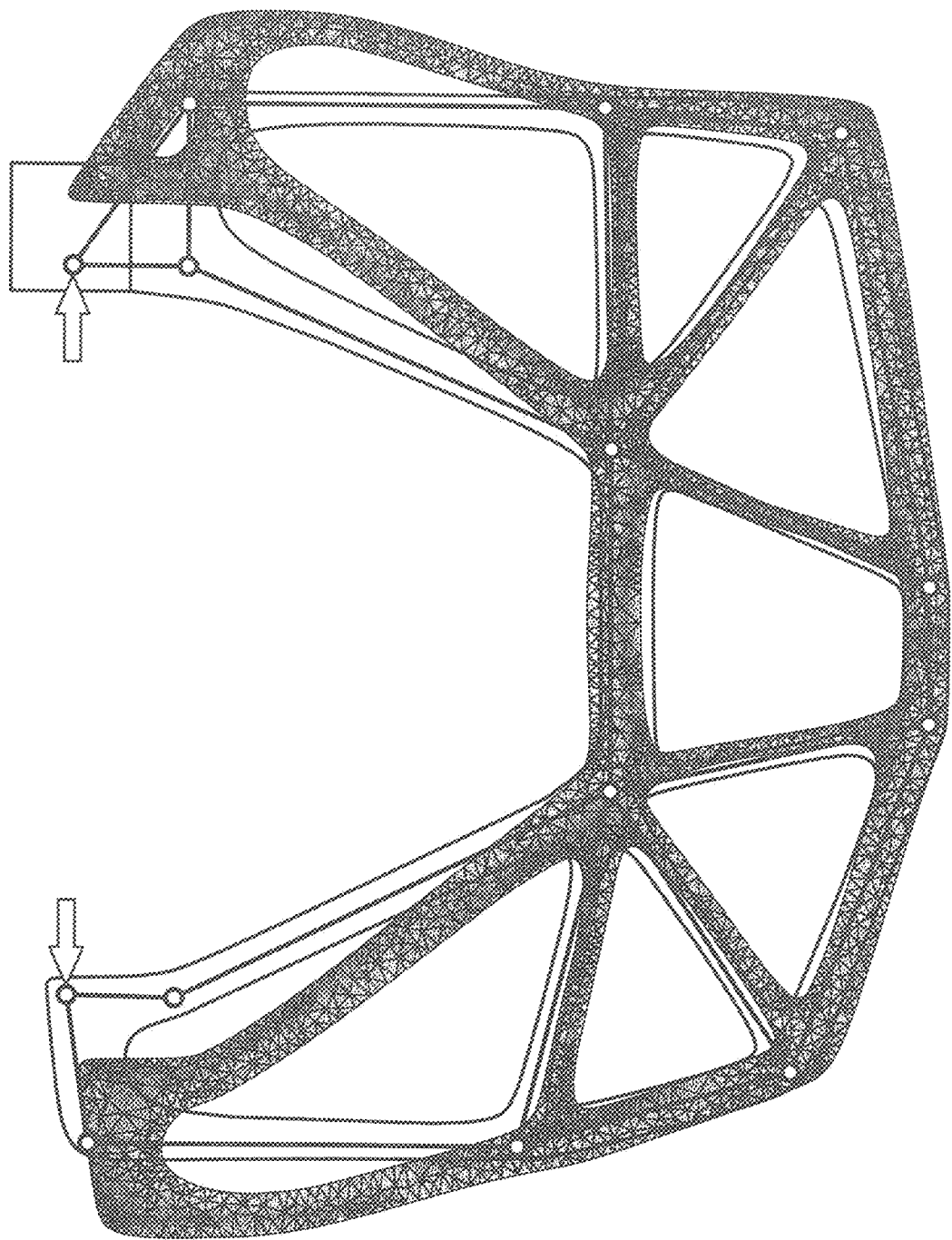
Figure 14A:
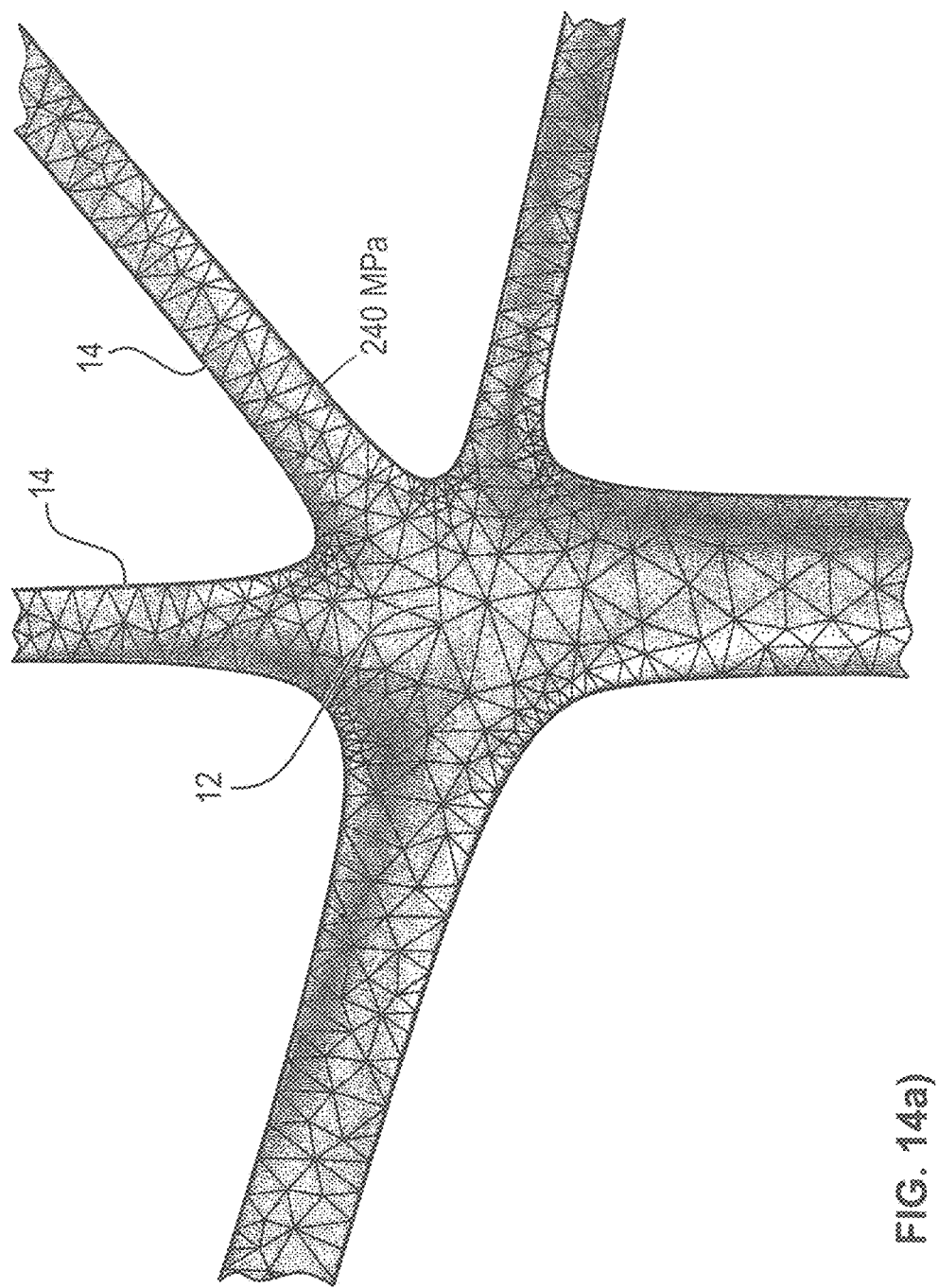

Some embodiments of the present invention are described more closely with reference to the accompanying drawings. They show:

FIG. 1 shows a schematic side view of an embodiment of the C-shaped tool holder, FIG. 2 shows a sectional enlargement from the tool holder according to FIG. 1 in which continuously curving surface progressions are compared to circular arc/line progressions, FIG. 3 shows the enlarged view from FIG. 2 in which only the continuously curving surfaces are shown, FIG. 4 shows a schematic representation of an embodiment of a design of the tool holder according to FIG. 1 composed of a plurality of multiple-vertex frame bodies integrated into the frame structure, each as a frame polygon, FIG. 5 shows an assembly of the multiple-vertex frame bodies according to FIG. 4 composed of multiple triangles, quadrilaterals and at least one pentagon for designing the first and second leg that are connected to each other by a connecting leg, FIG. 6a-d shows a design of a multiple-vertex frame body from the tool holder according to FIG. 1 based on a frame polygon and an offset contour surrounding this frame polygon with continuously curving side surfaces, FIG. 7 shows an embodiment of a frame triangle designed from a frame polygon and a surrounding offset contour with continuously curving side surfaces that are defined by periodic 4th order NURBS curves on the basis of a plurality of generated junction points in the corner areas and in the middle of the sides of the offset polygons, FIG. 8 shows an embodiment of a triangular frame polygon, FIG. 9 shows an embodiment of the illustration of a deformation of the frame polygon from FIG. 8 with an offset contour, FIG. 10 shows an embodiment of a frame polygon in the form of a quadrilateral, FIG. 11 shows a schematic illustration of a deformation of the frame polygon according to FIG. 10 with the surrounding offset contour, FIG. 12 shows another schematic illustration of a deformation of a frame polygon in the form of a pentagon with offset contour, FIG. 13 shows a schematic illustration of a deformation of the tool holder from FIG. 1, and FIG. 14a, b shows a comparison of mechanical stresses at a junction point (A) with continuously curving connecting surfaces between adjacent bar elements and (B) with circular arc/line transitions, meaning continuously tangential transitions, between adjacent bar elements that meet at the junction point.

6. DETAILED DESCRIPTION

The present disclosure relates to a C-shaped tool holder 1 as shown in FIG. 1 in a schematic side view according to an embodiment. C-shaped tool holders 1 are generally known in view of their use, for example in rivet setting devices or clinching tools. They consist of one first 3 and one second leg 5 (see the dashed-dotted line in FIG. 1) which run horizontally in FIG. 1 and are connected to each other by a connecting leg 7 (dashed line in FIG. 1).

The first 3 and the second leg 5 as well as the connecting leg 7 consist of an integral frame structure 10. Within this frame structure 10, they are integral with each other and do not exist as connected or connectable leg modules. In this context, integral means that the frame structure 10 forms a contiguous whole that is not able to be dismantled into its individual parts without destroying it. Correspondingly, the legs 3, 5, 7 are not connected to each other by force-fitting, frictional or surface-bonded connecting elements.

The integral frame structure 10 of the tool holder 1 is formed by a plurality of bar elements 14 that are connected to each other via intersections 12. A plurality of bar elements 14 each encloses a free space 16 and thereby forms frame triangles 20, frame quadrilaterals 22, frame pentagons 24 as well as multiple-vertex frame bodies with more than five corners (not shown). These are summarized as multiple-vertex frame bodies and have any number of, but at least 3, corners.

To optimally control the deformation behavior of the tool holder 1, the integral frame structure 10 is composed of a combination of adjacent multiple-vertex frame bodies 20, 22, 24. This results in a framework. The multiple-vertex frame bodies may have 3, 4 or 5 corner points. In the first 3 and second leg 5, which are also referred to as arms, preferably frame quadrilaterals or frame pentagons alone or in conjunction with other multiple-vertex frame bodies are employed to control the bending-up behavior of the tool holder 1. In the connecting leg 7, a central frame quadrilateral 22 may be used. This is combined according to different embodiments with frame triangles 20 arranged opposite each other, such as two or four (see FIG. 1).

In this design of the tool holder 1, its practical use results in considerable mechanical stress loads in the bordering bar elements 14 of the frame structure 10. To counteract this, in the prior art bar cross-sections of the bar elements 18 are correspondingly enlarged. This occurs either by individually widening a used bar or overall by increasing the thickness of a plate from which a C-frame is manufactured.

FIG. 2 shows a sectional enlargement from the frame structure 10. The bar elements 14 may be connected to each other at the intersections 12 by continuously curving connecting surfaces 30 (see continuous line in FIG. 2). The connecting surfaces 30 may be determined with the assistance of periodic, continuously curving $4^{th}$ order NURBS curves with variable curvature. Based on this shaping of the transition areas between bar elements 14 at intersections 12, mechanical stresses that appear near the intersections 12 are optimally distributed across the area of the intersection 12. Moreover, in this manner disadvantageous mechanical stress peaks in this area are reduced or avoided.

Figure 14B:
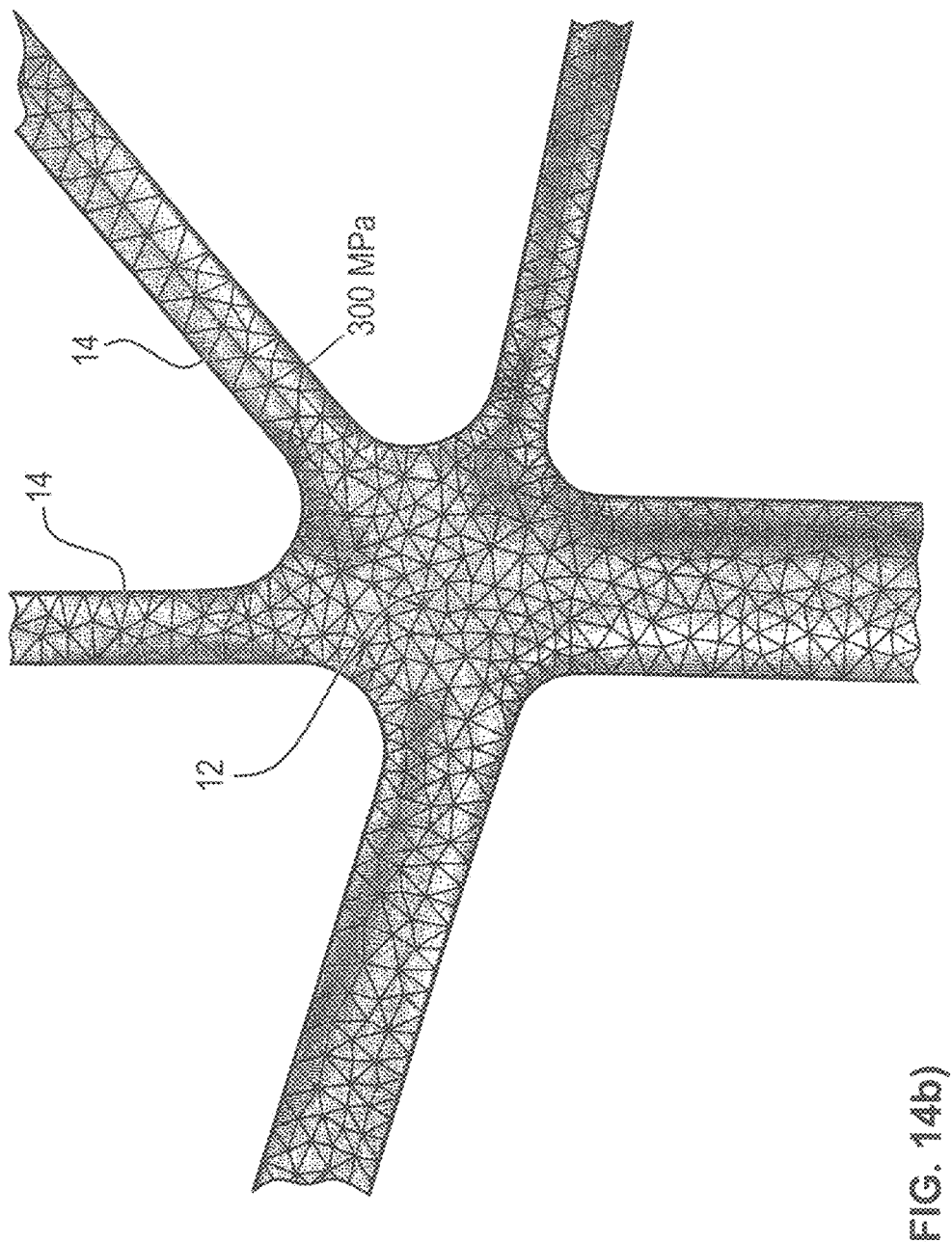

It is also conceivable to connect adjacent bar elements 14 to each other in intersections 12 via roundings of bordering bar element edges (see dotted line in FIG. 2). A rounding is a curve segment with constant curvature that transitions to the straight bar element edges tangentially continuously. Thereby, areas of non-optimal mechanical stress distribution occur in transition areas between the curve segment and straight bar element edges. In this context, FIG. 14 shows a comparison of mechanical stresses that occur at an intersection 12 with tangentially continuous transition areas between bar elements 14 (see FIG. 14b) and the same intersection 12 with continuously curving transition areas (see FIG. 14a). The mechanical stress values show that the intersection 12 with tangentially continuous transition areas between the bar elements 14 is subjected to stronger mechanical loads than the intersection 12 with continuously curving transition areas.

FIG. 3 once again shows the sectional enlargement from FIG. 2 but only with continuously curving connections between adjacent bar elements 14 in the area of intersections 12 (represented here with a dotted line).

To design the tool holder 1, the connecting leg 7 is made from at least two frame triangles 20 and one multiple-vertex frame body 22; 24 and its first 3 and its second leg 5 are each made from at least one multiple-vertex frame body 22; 24. It may also be preferable to make the connecting leg 7 from at least four frame triangles 20 and one frame quadrilateral 22, and to make the first 3 and the second leg 5 each from at least one frame quadrilateral 22 or one frame pentagon 24.

For a simplified representation of the make-up of the tool holder 1, this is considered in the drawing plane of the accompanying drawings. Correspondingly, the surface of the free space 16 that is enclosed in a multiple-vertex frame body 20, 22, 24 lies in the drawing plane. The bar elements 14 have a width and a depth. The width lies in the drawing plane and the depth extends vertically into or out of the drawing plane. Correspondingly, the free space 16 in a multiple-vertex frame body 20, 22, 24 may be surrounded by a depth surface, curving along a circumferential direction, that is arranged vertically to the drawing plane.

Under the assumption that the tool holder 1 has a constant depth vertical to the drawing plane, the legs 3, 5, 7 are made from a plurality of multiple-vertex frame bodies 20, 22, 24. These multiple-vertex frame bodies 20, 22, 24 form the outer C-shaped edge $R_a$ and the inner C-shaped edge $R_i$. The outer $R_a$ and the inner edge $R_i$ are formed by bar elements 14 of the multiple-vertex frame bodies 20, 22, 24 of the integral frame structure 10. Moreover, they are supported and connected to each other by the bar elements 14 within the integral frame structure 10. The inner $R_i$ and the outer edge $R_a$ may be delimited to the outside by continuously curving lateral surfaces that are arranged parallel to the depth direction.

It is also conceivable here to use tangentially continuous lateral surfaces.

To make the tool holder 1, the multiple-vertex frame bodies 20, 22, 24 are initially defined by frame polygons 30, 32, 34. The frame polygons 30, 32, 34 have, depending on the embodiment, three corners and three sides (see reference sign 30), four corners and four sides (see reference sign 32), five corners and five sides (see reference sign 34) or more. The corner points of the frame polygons are connected to each other at the intersections 12. The make-up described above of the legs 3, 5, 7 from the frame polygons 30, 32, 34 is illustrated in FIG. 5.

To optimally control the deformation behavior, the basic structure of the C-frame is composed of a combination of adjacent polygons. This results in a framework. The polygons have either 3, 4 or 5 corner points. In the arms of the C-frame, quadrilaterals or pentagons may be employed to control the bending-up behavior. In the middle area of the C-frame, a central frame quadrilateral is used.

With this design of the tool holder 1, the disclosure orients itself towards the example of nature, where loaded areas in junction points of trusses (e.g., forked branches) are configured like a continuously curving curve with variable curvature. Therefore, the transition areas between two adjacent bar elements 14 may be configured with periodic, continuously curving 4$^{th}$ order NURBS curves with variable curvature that optimally distribute the stress progression of the bar elements 14 near the intersection 12 over the area of the bifurcation and avoid stress peaks in the transition area.

To further design the tool holder 1, reference is made to the quadrilateral frame polygon 32 according to FIG. 6a. This serves as an example for the further configuration of the frame polygons 30, 32, 34 in the integral frame structure 10.

The frame polygons 30, 32, 34 of a basic structure according to FIG. 5 are set by offset calculations of the individual edges corresponding to a target strength of the later bar elements 14. This results in the offset polygons 40 that specify approximately the material contour of the later bar elements 40 of the integral frame structure (see FIG. 6b).

The junction points 42 on the middle of the edge and on the corner points of the offset polygons 40 are generated on the offset polygons 40. These serve as junction points 42 for the NURBS curves 50. On the basis of the junction points 42, periodic 4$^{th}$ order NURBS curves are generated that are represented by the reference sign 50 and meet the requirements for the curve continuity. Frame structures 10 optimized in this manner have, in addition to a reduction of the load from mechanical stress, additional weight advantages compared to the prior art since the employed material is distributed optimally. With reference to FIG. 6d, FIG. 7 shows an enlarged representation of the calculation of the integral frame structure 10.

The aforementioned NURBS curve C(u) is generally known and defined by the degree k, for example 3$^{rd}$ degree, of its basis polynomials (=order p of the NURBS curve–1), an amount P of weighted (w$_i$) control points P$_i$ and a joint vector U. NURBS curves and surfaces are generalizations of B-splines as well as Bézier curves and surfaces. The main difference from these two spline types is the weighting of the control points with the weights w$_i$. With the w$_i$ NURBS curves become rational.

The NURBS curve is fully defined by the sum of the control points P$_i$ weighted with rational B-spline base functions R$_{i,k}$, by the formula $$C(u) = \sum_{i=0}^{n} R_{i,k}(u) P_i$$

The rational B-spline base function is calculated from B-spline base functions N$_{i,k}$ of the degree of the basis polynomial k, such as 3, and the weights w$_i$ associated with control points as $$R_{i,k}(u) P_i = \frac{N_{i,k}(u) w_i}{\sum_{j=0}^{n} N_{j,k}(u) w_j}$$

The parameter u∈[a, b] activates the individual segments of the spline curves in the area of the joint vector $$V_K = \{\underbrace{a_{(0)}, \ldots, a_{(p-1)}}_{p}, u_p, \ldots, u_n, \underbrace{b_{(n+1)}, \ldots, b_{(n+p)}}_{p}\}$$

The elements of the joint vector V$_K$ are monotonically increasing, wherein all a$_{(i)}$=a$_{(j)}$ as well as all b$_{(i)}$=b$_{(j)}$.

Similar calculations can be performed for NURBS surfaces according to the following formulas:

$$S(u, v) = \sum_{i=0}^{n} \sum_{j=o}^{n} R_{i,j}(u, v) P_{i,j}$$

$$R_{i,j}(u, v) = \frac{N_{i,p}(u) N_{j,q}(v) w_{i,j}}{\sum_{k=0}^{n} \sum_{l=0}^{m} N_{k,p}(u) N_{l,q}(v) w_{k,l}}$$

The design method described above may be computer-based, meaning performed with the assistance of an appropriate software program. Such software programs are generally known as CAD programs and are a usual tool in design technology. Such software programs and the computer-based systems that implement them may realize all the computer-based activities in a design process. These include geometric modeling, the calculating described above, simulating the integral tool holder 1. Moreover, a design data set may be created and given over to the production or respectively manufacturing. These are, for example, CNC machines that implement the computer-based data set into a product. In a similar manner, the result of the design method can also be implemented into a manufacturing drawing. Accordingly, the present invention also comprises the production of the tool holder 1 based on the computer-based, implemented design method above.

FIG. 8 shows a frame polygon 30 with three corners. To obtain a frame triangle 20, the frame polygon 30 was surrounded with the offset contour 40 (see above). When this frame triangle 20 is loaded by a force F according to FIG. 9, an angular bending-up is thereby generated in the loaded corner area. This is indicated by the arrow in FIG. 9.

A similar consideration of a frame quadrilateral 22 (see FIG. 10) or a frame pentagon leads to a parallel bending-up in the event of a mechanical load of a corner area. This is illustrated in FIGS. 11 and 12 by a mechanical load with the force F. This load F acts on the lower left corner of the frame quadrilateral 22 in FIG. 11 and of the frame pentagon 24 in FIG. 12.

It follows from this consideration that, based on the appropriate choice of a frame quadrilateral 22 or a frame pentagon 24 instead of a frame triangle 20, the deformation of the integral frame structure 10 under load can be deliberately adjusted towards a parallel bending-up. Therefore, it may be preferred to employ frame quadrilaterals 22 in the arms of the C-shaped tool holder 1, meaning in the first 3 and in the second leg 5.

This adjustment of the deliberate parallel bending-up of the tool holder 1 under mechanical load is illustrated in FIG. 13. Here the difference of the frame structure designed from frame polygons 30, 32, 34 in the non-loaded state from the parallel-deflected integral frame structure 10 demonstrates the deliberately influenced deformation of the tool holder 1 by the force F.

REFERENCE SIGN LIST

1 Tool holder
3, 5 First and second leg
7 Connecting leg
10 Integral frame structure
12 Intersection
14 Bar element
16 Free space
20 Frame triangle
22 Frame quadrilateral
24 Frame pentagon
30 Frame polygon with three corners
32 Frame polygon with four corners
34 Frame polygon with five corners
40 Offset polygon
42 Junction point
50 NURBS curve
60 Loaded frame structure
L Length
B Width
T Depth of the bar element 12

The invention claimed is:

1. A C-shaped tool holder consisting of an integral frame structure that is delimited by an inner and an outer edge, each C-shaped, in which the C-shaped edges are made from and connected to each other by at least five multiple-vertex frame bodies that are integrated into the frame structure, wherein in each case an inner side of the individual multiple-vertex frame bodies is a connecting surface, continuously curving along the circumferential direction, along the sides of the respective multiple-vertex frame body, and the inner and the outer C-shaped edge is each delimited to the outside by a continuously curving lateral surface.

2. The tool holder according to claim 1, the C-shape of which consists of a first and a second leg arranged opposite each other and a connecting leg, wherein the connecting leg connects the first and the second leg to each other to form a C-shape.

3. The tool holder according to claim 2, the connecting leg of which consists of at least two frame triangles and one multiple-vertex frame body, and the first and second leg of which each consist of at least one multiple-vertex frame body.

4. The tool holder according to claim 3, the connecting leg of which consists of at least four frame triangles and one frame quadrilateral, and the first and second leg of which each consist of at least one frame quadrilateral or one frame pentagon.

5. The tool holder according to claim 3, the multiple-vertex frame bodies of which each enclose a free space having a surface that is surrounded by a bar structure with a depth and a width, the depth of which is defined orthogonally to the surface and the width of which is defined parallel to the surface, wherein the depth surfaces of the multiple-vertex frame bodies that are arranged opposite each other, are spaced apart from each other by the width of the bar structure and run parallel to the depth form continuously curving frame surfaces.

6. The tool holder according to claim 5, the depth surfaces of which, considered in the depth direction, form an inner and an outer contour line per multiple-vertex frame body that are each defined as a periodic fourth order NURBS curve on the basis of a plurality of generated junction points at least in corner areas of the respective multiple-vertex frame body.

7. The tool holder according to claim 3, the connecting leg of which consists of at least four frame triangles and one frame quadrilateral, and the first and second leg of which each consist of at least one frame quadrilateral or one frame pentagon and the multiple-vertex frame bodies of which each enclose a surface that is surrounded by a bar structure with a depth and a width, the depth of which is defined orthogonally to the surface and the width of which is defined parallel to the surface, wherein the depth surfaces of the multiple-vertex frame bodies that are arranged opposite each other, are spaced apart from each other by the width of the bar structure and run parallel to the depth form continuously curving frame surfaces.

8. The tool holder according to claim 7, the depth surfaces of which, considered in the depth direction, form an inner and an outer contour line per multiple-vertex frame body that are each defined as a periodic fourth order NURBS curve on the basis of a plurality of generated junction points at least in corner areas of the respective multiple-vertex frame body.

9. The tool holder according to claim 2, the connecting leg of which consists of at least four frame triangles and one frame quadrilateral, and the first and second leg of which each consist of at least one frame quadrilateral or one frame pentagon.

10. The tool holder according to claim 2 in which the first and the second leg each has a free end, wherein a drive unit or an attachment unit is provided integrally or modularly on at least one end.

11. The tool holder according to claim 1 that is produced integrally from metal or from a hybrid fiber-reinforced plastic (FRP) or a fiber-plastic composite (FPC).

12. The tool holder according to claim 1, in which the multiple-vertex frame bodies are triangles, quadrilaterals and pentagons.

13. A joining device that has a C-shaped tool holder according to claim 1 with a drive unit and a counter bearing.

14. The joining device according to claim 13, in which the joining device is a rivet setting device and the counter bearing is a die.

15. A design method of a C-shaped tool holder according to claim 1 with an integral frame structure that is delimited by an inner and an outer edge, each C-shaped, with the following steps:
  a. Defining a first and a second leg that are arranged opposite each other and are connected with a connecting leg to form a C-shaped structure,
  b. Forming the first and the second leg as well as the connecting leg from at least five multiple-vertex frame bodies that are connected to each other, and
  c. Forming a C-shaped outer edge and a C-shaped inner edge of the tool holder consisting of the multiple-vertex frame bodies that are connected to each other by a continuously curving C-shaped outer lateral surface and a continuously curving C-shaped inner lateral surface, as well as d. Forming the individual multiple-vertex frame bodies each with a continuously curving inner frame surface.

16. The design method according to claim 15 with the further steps:
Defining each multiple-vertex frame body in a common design plane as a frame polygon and
Defining an offset contour within the design plane that is spaced apart on both sides from the frame polygon so that the offset contour determines a width of the multiple-vertex frame body within the design plane and is composed of two offset polygons.

17. The design method according to claim 16 in which the width of the offset contour on the individual sides of the frame polygon is the same or different.

18. The design method according to claim 16 with the further steps:
Generating junction points at the corners and in the middle of the sides of the offset polygons and
Generating periodic fourth order NURBS curves consisting of third degree polynomials on the basis of the generated junction points.

19. The design method according to claim 15 with the further step of computer-based implementing of the design method and creating a computer-based data set for producing the tool holder.

20. A production method of a C-shaped tool holder according to claim 1 with an integral frame structure, having the following steps:
a. Receiving a computer-based data set from a CAD system for the C-shaped tool holder to be produced,
b. Forwarding the computer-based data set to a production machine, and
c. Producing and finishing the C-shaped tool holder according to the computer-based data set.

* * * * *